United States Patent
Watanabe et al.

[11] Patent Number: 5,932,179
[45] Date of Patent: Aug. 3, 1999

[54] WASTE GAS TREATMENT APPARATUS

[75] Inventors: Teruo Watanabe, Ushiku; Hiromi Tanaka, Abiko, both of Japan

[73] Assignee: Sumitomo Heavy Industries, Ltd., Japan

[21] Appl. No.: 08/951,451

[22] Filed: Oct. 16, 1997

[30] Foreign Application Priority Data

Oct. 30, 1996 [JP] Japan .................................... 8-288458

[51] Int. Cl.[6] .................................................. B01D 50/00
[52] U.S. Cl. .......................... 422/177; 422/171; 422/190; 422/191; 422/216; 422/239; 55/474; 55/518; 96/123; 96/150; 96/152
[58] Field of Search ..................................... 422/169, 172, 422/171, 177, 190, 216, 219, 239; 55/474, 518, 479; 96/123, 150, 152

[56] References Cited

U.S. PATENT DOCUMENTS

| | | | |
|---|---|---|---|
| 4,149,858 | 4/1979 | Noack et al. | 55/479 |
| 4,333,751 | 6/1982 | Iwamura et al. | 422/171 |
| 5,294,420 | 3/1994 | Ito | 423/239.1 |
| 5,527,514 | 6/1996 | Watanabe et al. | 422/171 |

*Primary Examiner*—Hien Tran
*Attorney, Agent, or Firm*—Lorusso & Loud

[57] ABSTRACT

There is disclosed a waste gas treatment apparatus in which dust concentration at a treated gas outlet is sufficiently reduced and the desulfurizing efficiency and denitrating efficiency of grains are increased. The waste gas treatment apparatus includes an inlet member, an outlet member, a moving layer of the grains therebetween, a first perforated plate disposed between the inlet member and the outlet member for defining a front chamber in combination with the inlet member, a second perforated plate disposed between the inlet member and the outlet member for defining an intermediate chamber in combination with the first perforated plate and for defining a rear chamber in combination with the outlet member, and flow controllers for setting the moving speed of grain in the front, intermediate and rear chambers. The moving speed of grains in the front chamber is higher than that in the intermediate chamber and the moving speed of grains in the intermediate chamber is higher than that in the rear chamber.

6 Claims, 7 Drawing Sheets

WASTE GAS TREATMENT APPARATUS

BACKGROUND OF THE INVENTION

1. Field of the invention

The present invention relates to a waste gas treatment apparatus.

2. Description of the Related Art

In a conventional waste gas treatment apparatus, a catalyst forming a moving layer is accommodated between two parallel louvers. The catalyst is caused to move downward in a vertical direction, while a gas to be treated is fed into the moving layer through one louver, and the treated gas is discharged through the other louver.

FIG. 1 is a schematic view of a conventional waste gas treatment apparatus.

In FIG. 1, reference numeral 31 denotes a tower, wherein a gas inlet 34 and a treated gas outlet 35 are formed on opposed side walls 32 and 33, respectively. The interior of the tower 31 is partitioned by an inlet louver 11 and an outlet louver 12 which are disposed in parallel with each other. An unillustrated catalyst is accommodated between the inlet louver 11 and the outlet louver 12 to thereby form a moving layer 10.

A gas to be treated is fed into the moving layer 10 through the gas inlet 34 and the inlet louver 11. The fed gas sufficiently contacts the catalyst in the moving layer 10, so that dust is collected, and the gas is desulfurized and denitrated. The thus-treated gas is discharged from the treated gas outlet 35, through the outlet louver 12.

Meanwhile, the catalyst is fed into the moving layer 10 through a feed port 46 formed at the top end of the tower 31, moves downward in the moving layer 10, and is discharged through a discharge port 16.

A discharge roller 18 is disposed at the discharge port 16 and is rotated in the direction of the arrow at a predetermined speed, so that the catalyst moves downward in the moving layer 10 at a predetermined speed and is discharged through the discharge port 16.

The catalyst discharged through the discharge port 16 circulates to the feed port 46 through a regeneration apparatus 60 and a line 61. Reference numerals 13 and 14 denote lower walls, and numeral 20 denotes a flow-straightening cone.

FIG. 2 is a sectional view of essential portions of the conventional waste gas treatment apparatus.

As shown in FIG. 2, a catalyst 19 is accommodated in a space defined by the inlet louver 11 and the outlet louver 12 disposed in parallel with each other, to thereby confine the moving layer 10. The lower walls 13 and 14 extend obliquely downward from the bottom ends of the inlet and outlet louvers 11 and 12, respectively. The distance between the lower walls 13 and 14 gradually becomes narrower in the downward direction, to thereby form the discharge port 16 at the bottom ends of the lower walls 13 and 14. The discharge roller 18 is disposed at the discharge port 16. The flow-straightening cone 20 having an inverted-V-shaped cross section is disposed along the discharge port 16 in the lower area of the moving layer 10 so as to smoothly direct the catalyst 19 downward.

However, in the aforementioned conventional waste gas treatment apparatus, the form of the catalyst 19 changes from pattern a to pattern b as it moves downward in the moving layer 10.

In this case, the catalyst 19 fails to uniformly move in the moving layer 10 and moves at a slower speed in the vicinity of the inlet louver 11. Accordingly, in the vicinity of the inlet louver 11, the catalyst 19 becomes clogged with dust which is contained in the incoming gas. Also, the catalyst 19 stagnates in a boundary area c between the inlet louver 11 and the lower wall 13, a boundary area d between the outlet louver 12 and the lower wall 14, and a top surface e of the flow-straightening cone 20.

In order to prevent the catalyst 19 from becoming clogged with dust and from stagnating, there is provided a waste gas treatment apparatus (refer to Japanese Patent Application Laid-Open (Kokai) No. 7-136445) wherein the space of the moving layer 10 is divided into a front chamber and a rear chamber by a perforated plate such that the catalyst 19 in the front chamber moves at a sufficiently higher speed than does the catalyst 19 in the rear chamber.

However, in such a waste gas treatment apparatus, an increased moving speed of the catalyst 19 in the front chamber causes the catalyst 19 to form a powder due to wear and causes the thus-formed powder to scatter. Thus, dust concentration at the treated gas outlet 35 (FIG. 1) increases accordingly, resulting in failure to reduce dust in a flue gas discharged from an unillustrated stack to an insignificant level (5 to 10 mg/Nm$^3$).

If the moving speed of the catalyst 19 in the front chamber is limited, the desulfurizing efficiency and denitrating efficiency of the catalyst 19 decrease accordingly.

SUMMARY OF THE INVENTION

An object of the present invention is to solve the above-mentioned problems in the conventional waste gas treatment apparatus and to provide a waste gas treatment apparatus which can prevent the catalyst from becoming clogged with dust or stagnant, sufficiently reduce dust concentration at a treated gas outlet, and increase the desulfurizing efficiency and denitrating efficiency of the catalyst.

To achieve the above object, the present invention provides a waste gas treatment apparatus which has an inlet member, an outlet member for defining a moving layer in combination with the inlet member, a first perforated plate disposed between the inlet member and the outlet member for defining a front chamber in combination with the inlet member, a second perforated plate disposed between the inlet member and the outlet member for defining an intermediate chamber in combination with the first perforated plate and for defining a rear chamber in combination with the outlet member, and flow control apparatuses disposed at the bottom ends of the front, intermediate and rear chambers for setting the moving speed of catalyst in the front, intermediate and rear chambers.

The flow controllers are adjusted such that the moving speed of catalyst in the front chamber is higher than that in the intermediate chamber and the moving speed of catalyst in the intermediate chamber is higher than that in the rear chamber.

Thus, even when a gas having high dust concentration is fed into the front chamber, the high moving speed of catalyst in the front chamber makes the gas flow smoothly through the catalyst layer to thereby reduce the pressure loss of the gas flow.

Accordingly, the catalyst in the front chamber can be prevented from becoming clogged with dust or stagnant. The high moving speed of catalyst causes the gas to smoothly disperse throughout the moving layer.

Also, the high moving speed of catalyst in the intermediate chamber makes the gas flow smoothly through the catalyst layer to thereby reduce the pressure loss of the gas flow.

Accordingly, the catalyst in the intermediate chamber can be prevented from becoming clogged with dust or stagnant.

Further, the low moving speed of catalyst in the rear chamber can prevent the catalyst from forming a powder, which would otherwise occur due to wear, and the thus-formed powder from scattering.

Accordingly, dust concentration at the treated gas outlet is rendered low.

In another waste gas treatment apparatus according to the present invention, the moving speed v2 of catalyst in the intermediate chamber is set to $(2/3) \cdot v1$ to $(1/5) \cdot v1$, where v1 is the moving speed of catalyst in the front chamber, and the moving speed v3 of catalyst in the rear chamber is set to $(2/3) \cdot v2$ to $(1/5) \cdot v2$, where v2 is the moving speed of catalyst in the intermediate chamber.

In still another waste gas treatment apparatus according to the present invention, the layer thickness of the front chamber is 10% to 20% the overall thickness of the moving layer, and the layer thickness of the intermediate chamber is 20% to 45% the overall thickness of the moving layer.

Since the layer thickness of the front chamber is 10% to 20% the overall thickness of the moving layer, the powder pressure in the front chamber becomes relatively low so that the gas smoothly disperses throughout the moving layer. Also, since the volume of the front chamber is sufficiently small as compared with that of the entire moving layer, wear of catalyst in the front chamber is slight.

Also, since the layer thickness of the intermediate layer is 20% to 45% the overall thickness of the moving layer, dust collection efficiency in the intermediate chamber is relatively high.

BRIEF DESCRIPTION OF THE DRAWINGS

The structure and features of the waste gas treatment apparatus according to the present invention will be readily appreciated as the same becomes better understood by referring to the drawings, in which.

DESCRIPTION OF THE PREFERRED EMBODIMENTS

Embodiments of the present invention will next be described in detail with reference to the drawings.

Figure 1:
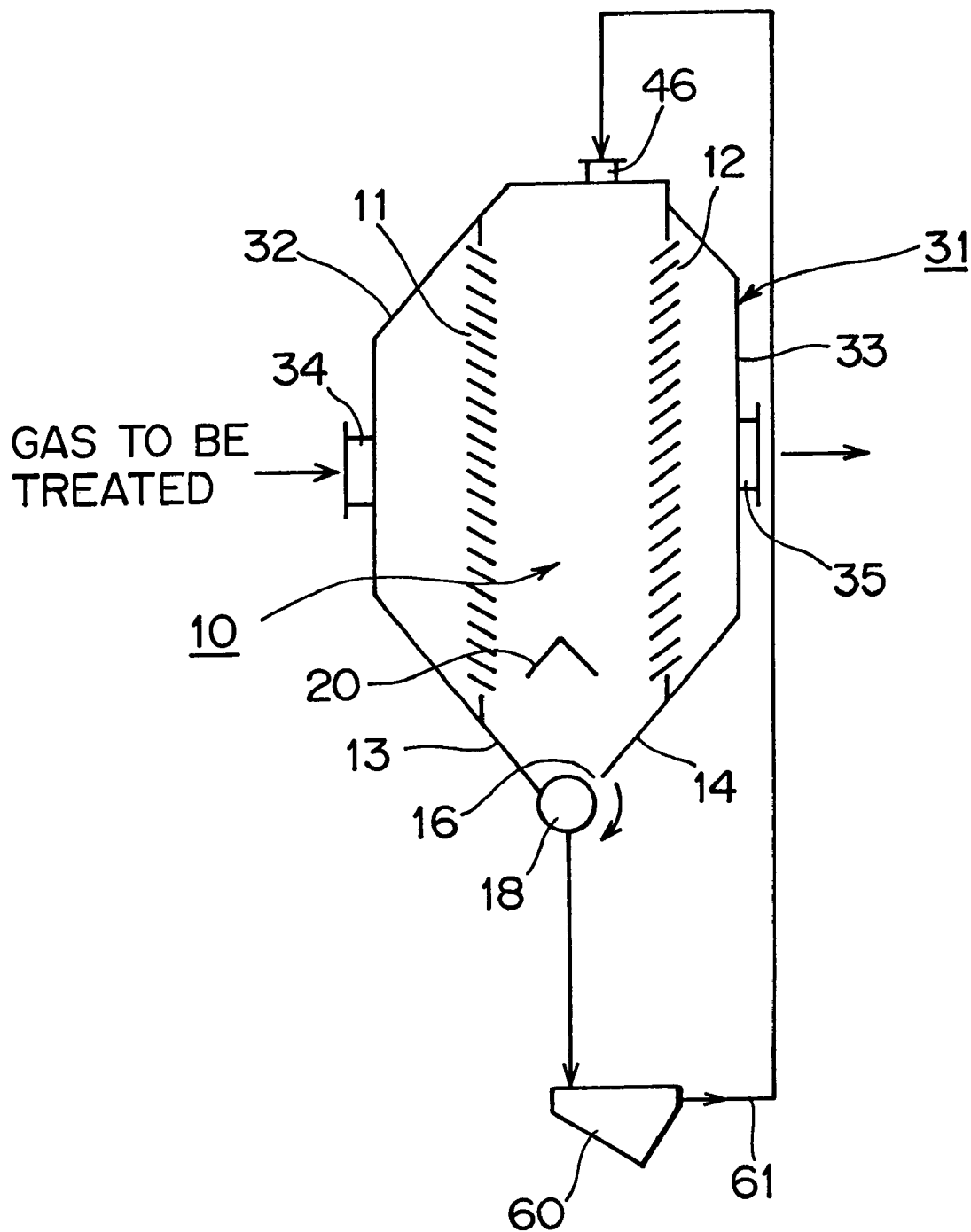
FIG. 1 is a schematic view of a conventional waste gas treatment apparatus.
Figure 2:
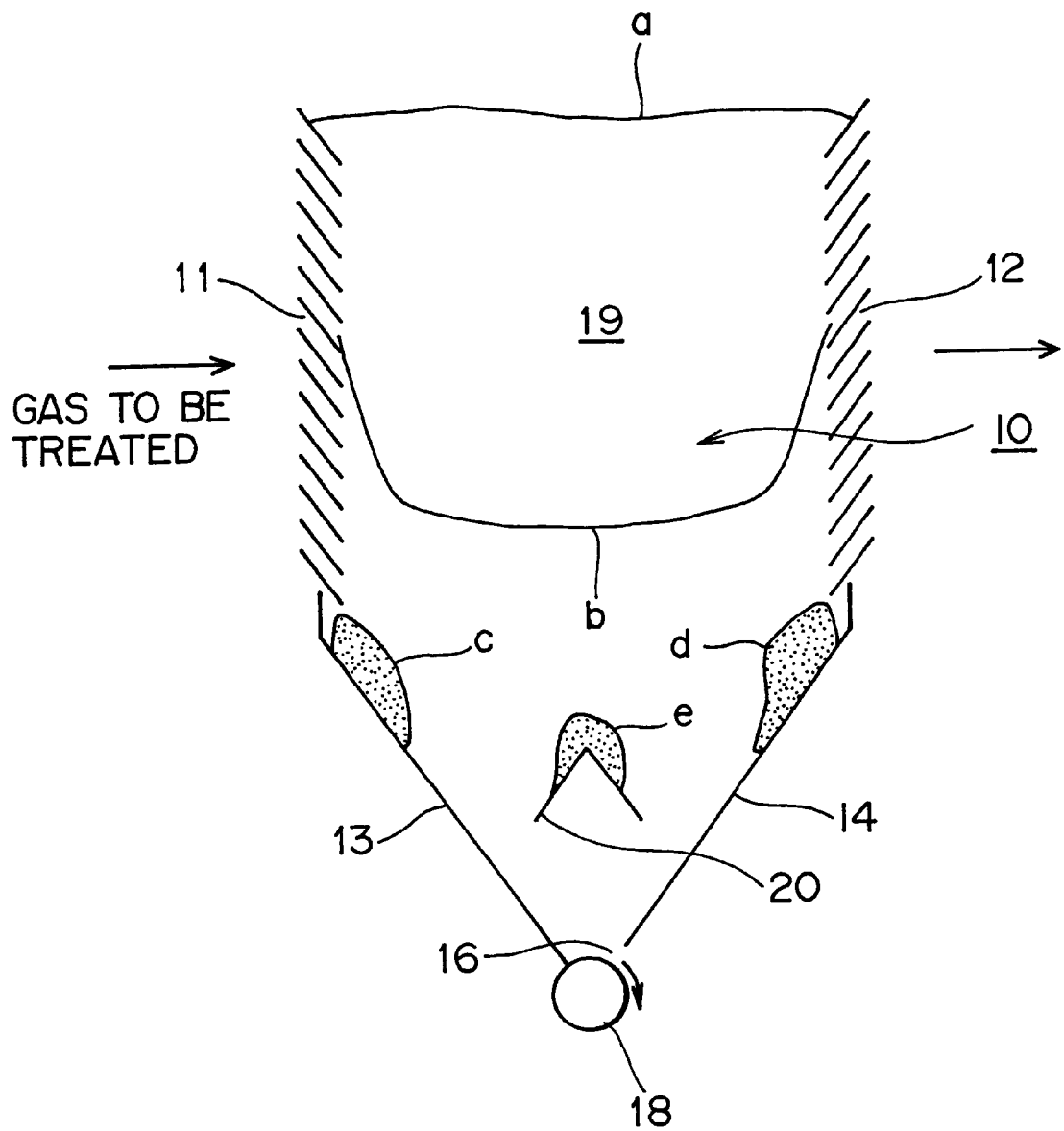
FIG. 2 is a sectional view of essential portions of the conventional waste gas treatment apparatus.
Figure 3:
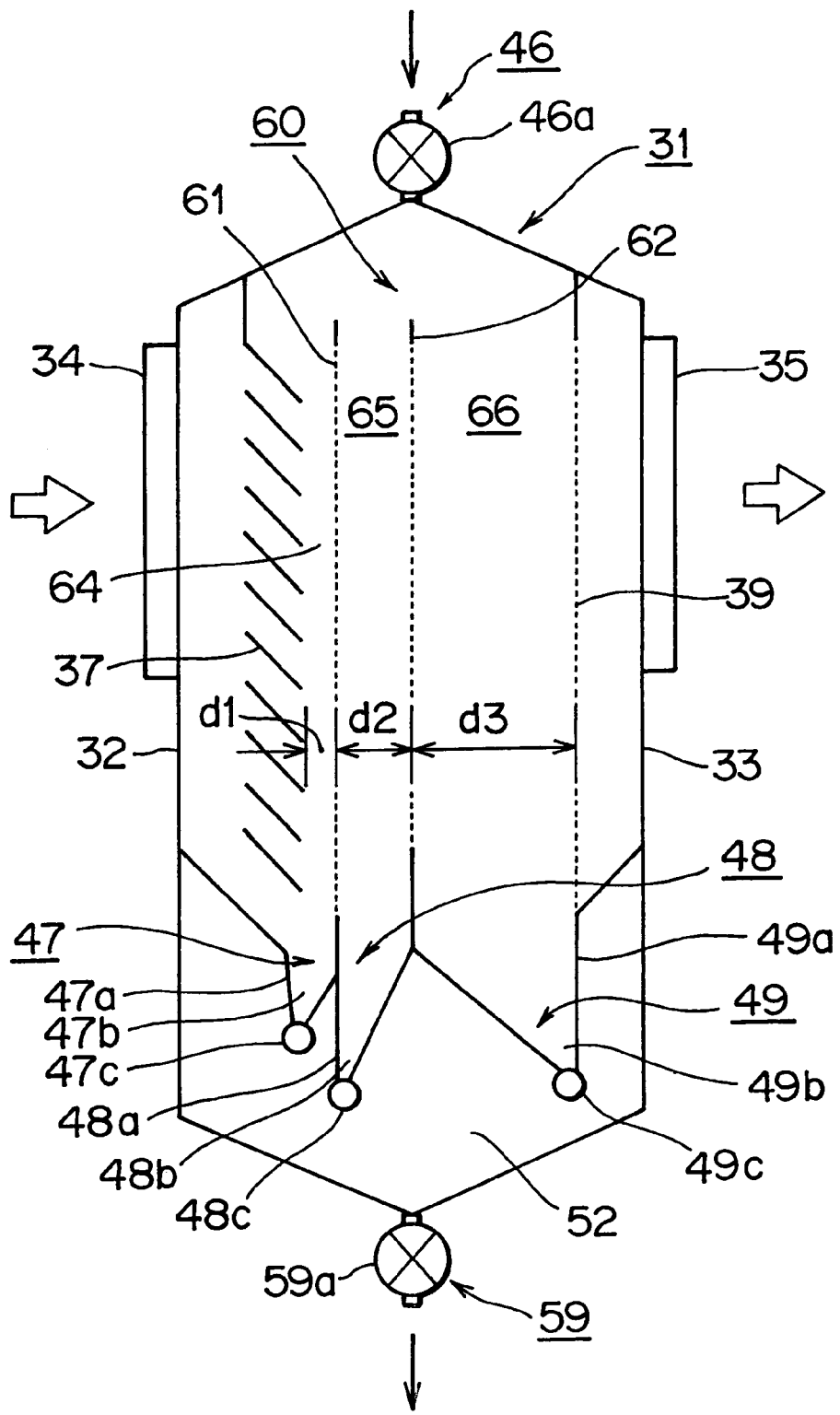
FIG. 3 is a sectional view of a waste gas treatment apparatus according to a first embodiment of the present invention.

FIG. 3 is a sectional view of a waste gas treatment apparatus according to a first embodiment of the present invention.

In FIG. 3, reference numeral 31 denotes a tower, whose opposed side walls 32 and 33 have a gas inlet 34 and a treated gas outlet 35, respectively. The interior of the tower 31 is partitioned by an inlet louver 37, a first perforated plate 61, a second perforated plate 62, and an outlet perforated plate 39. Unillustrated activated carbon (A.C.) is accommodated in the space between the inlet louver 37 and the outlet perforated plate 39 to thereby form a moving layer 60. The present embodiment uses the inlet louver 37 having a lesser surface area so as to prevent dust from adhering to the surface thereof. An outlet louver may be used in place of the outlet perforated plate 39.

A front chamber 64 is defined between the inlet louver 37 and the first perforated plate 61, an intermediate chamber 65 is defined between the first perforated plate 61 and the second perforated plate 62, and a rear chamber 66 is defined between the second perforated plate 62 and the outlet perforated plate 39.

A gas is fed into the front chamber 64 through the gas inlet 34 and then the inlet louver 37. Along this path, the flow rate of the gas is extremely low, specifically about 1/10 to 1/20 that in a flue connected to the treated gas outlet. Accordingly, dust contained in the incoming gas is caused to separate by gravity in the front chamber 64. Subsequently, the gas is fed into the intermediate chamber 65 through the first perforated plate 61 and is then fed into the rear chamber 66 through the second perforated plate 62. The treated gas is discharged from the treated gas outlet 35 through the outlet perforated plate 39.

Meanwhile, the activated carbon is fed into the front chamber 64, the intermediate chamber 65 and the rear chamber 66 through a feed port 46 formed at the top end of the tower 31. The fed activated carbon moves downward in the front chamber 64, the intermediate chamber 65 and the rear chamber 66, and is then discharged from discharge hoppers 47, 48 and 49, respectively. In the front chamber 64, the intermediate chamber 65 and the rear chamber 66, the gas collides with the activated carbon and disperses, so that dust is collected by the activated carbon, and desulfurization and denitration are performed.

The discharge hoppers 47, 48 and 49 have an asymmetric shape and include respectively a side wall portion 47a which vertically extends downward from the bottom end of the inlet louver 37, a side wall portion 48a which vertically extends downward from the bottom end of the first perforated plate 61, and a side wall portion 49a which vertically extends downward from the bottom end of the outlet perforated plate 39.

Accordingly, after being moved downward along the inlet louver 37, the first perforated plate 61 and the outlet perforated plate 39, the activated carbon moves downward smoothly along the respective side walls 47a, 48a and 49a without stagnation.

Also, the discharge hoppers 47, 48 and 49 have, at their bottom ends, respective first discharge ports 47b, 48b and 49b, at which respective discharge rollers 47c, 48c and 49c serving as flow controllers are disposed. Through adjustment of the rotational speeds of the discharge rollers 47c, 48c and 49c, the moving speeds v1, v2 and v3 of activated carbon in the front chamber 64, the intermediate chamber 65 and the rear chamber 66, respectively, are set. In this case, since the first perforated plate 61 is disposed between the front chamber 64 and the intermediate chamber 65, and the second perforated plate 62 is disposed between the intermediate chamber 65 and the rear chamber 66, the activated carbon is prevented from moving through the first perforated plate 61 and the second perforated plate 62. Thus, the moving speed of the activated carbon can be set differently to v1, v2 and v3 for the front chamber 64, the intermediate chamber 65, and the rear chamber 66, respectively.

After moving downward in the front chamber 64, the intermediate chamber 65 and the rear chamber 66, the activated carbon is discharged from the first discharge ports 47b, 48b and 49b, respectively, and is then discharged from a second discharge port 59 via a collecting hopper 52. A feed valve 46a is disposed at the feed port 46, and a discharge valve 59a is disposed at the second discharge port 59.

The moving speed v1 of the activated carbon in the front chamber 64 is set highest (2 to 5 times that of a conventional waste gas treatment apparatus).

In this case, even when a gas having a dust concentration of not less than 200 mg/Nm$^3$, for example, 350 to 500 mg/Nm$^3$ is fed into the front chamber 64, and thus the amount of dust collected per grain of activated carbon is relatively large, the gas passes through the activated carbon layer smoothly, so that its pressure loss is rendered relatively small.

Accordingly, the activated carbon can be prevented from becoming clogged with dust or stagnant. Because of the high moving speed v1 of the activated carbon, the gas can smoothly disperse throughout the entire moving layer 60.

According to experimental findings, a layer thickness d1 of the front chamber 64 is preferably 10% to 20% the overall thickness of the moving layer 60. As a result, the friction of the activated carbon with the input louver 37, the first perforated plate 61, etc. significantly contributes toward reducing a powder pressure in the front chamber 64. Thus, the gas fed through the input louver 37 can smoothly disperse throughout the entire moving layer 60. Also, since the volume of the front chamber 64 is sufficiently small as compared with that of the entire moving layer 60, i.e. an SV value, the activated carbon wears less.

In the front chamber 64, unillustrated partitions may be disposed perpendicularly to the first perforated plate 61 (disposed at 1 meter intervals for a waste gas treatment apparatus having a height of not less than 20 m) to thereby further reduce the powder pressure.

In the intermediate chamber 65, since the amount of dust collected per grain of activated carbon is relatively large as in the front chamber 64, the moving speed v2 of the activated carbon is set to $(2/3) \cdot v1$ to $(1/5) \cdot v1$, preferably $(1/2) \cdot v1$ to $(1/3) \cdot v1$.

Accordingly, the gas passes through the activated carbon smoothly, so that its pressure loss is rendered relatively small, thereby preventing the activated carbon from becoming clogged with dust or stagnant.

A layer thickness d2 of the intermediate chamber 65 is set based on dust concentration at the gas inlet 34 and a dust collection efficiency, specifically to 20% to 45% the overall thickness of the moving layer 60 in the present embodiment. The dust collection efficiency depends on the grain size distribution of dust contained in the inlet gas, the grain size of the activated carbon, the flow rate of the inlet gas, and the like. Thus, the layer thickness d2 of the intermediate chamber 65 is set in accordance with the grain size distribution of dust contained in the inlet gas, the grain size of the activated carbon, the flow rate of the inlet gas, and the like.

In the rear chamber 66, the moving speed v3 of the activated carbon is set in accordance with dust concentration at the treated gas outlet 35, specifically to $(2/3) \cdot v2$ to $(1/5) \cdot v2$, preferably $(1/2) \cdot v2$ to $(1/3) \cdot v2$. In this case, the moving speed v3 of the activated carbon is relatively low, thereby preventing the activated carbon from forming a powder, which would otherwise occur due to wear, and the thus-formed powder from scattering. Thus, dust concentration at the treated gas outlet 35 is rendered low.

A layer thickness d3 of the rear chamber 66 is obtained by subtracting the sum of the layer thickness d1 of the front chamber 64 and the layer thickness d2 of the intermediate chamber 65 from the overall thickness of the moving layer 60.

A space velocity ("SV") value is calculated based on desulfurizing efficiency and denitrating efficiency required for treating a gas. Based on the thus-calculated SV value, the overall thickness of the moving layer 60 is calculated.

A desired desulfurizing efficiency can be obtained relatively easily through an appropriate selection of a space velocity (the flow rate of gas) in the moving layer 60 and the residence time of activated carbon (corresponding to a mean value of the moving speeds v1, v2 and v3 of activated carbon in the front chamber 64, the intermediate chamber 65 and the rear chamber 66). Meanwhile, the denitrating efficiency is influenced greatly by $SO_2$ concentration, $NO_x$ concentration, the gas temperature and the like at the gas inlet 34. Accordingly, the dimensions of the tower 31 and the residence times of activated carbon are set in accordance with the denitrating efficiency.

When the activated carbon fed through the feed port 46 drops into the moving layer 60 through the feed valve 46a, based on the angle of repose of grains, coarse grains are distributed to the front chamber 64 and to a region of the rear chamber 66 near the outlet perforated plate 39, while fine grains are distributed to the intermediate chamber 65 and to a region of the rear chamber 66 near the second perforated plate 62.

Accordingly, even when a gas having a high dust concentration is fed into the front chamber 64, activated carbon does not become clogged with dust or stagnant, since coarse grains of activated carbon are in the front chamber 64. Also, since coarse grains of activated carbon are in the region of the rear chamber 66 near the outlet perforated plate 39, the activated carbon does not form a powder to scatter.

Since fine grains of activated carbon move through the intermediate chamber 65 and the region of the rear chamber 66 near the second perforated plate 62, the gas is desulfurized and denitrated in the intermediate chamber 65 and the region of the rear chamber 66 near the second perforated plate 62.

Next will be described the distributions of the moving speeds v1, v2 and v3 of activated carbon in the front chamber 64, the intermediate chamber 65 and the rear chamber 66, respectively.

Figure 4:
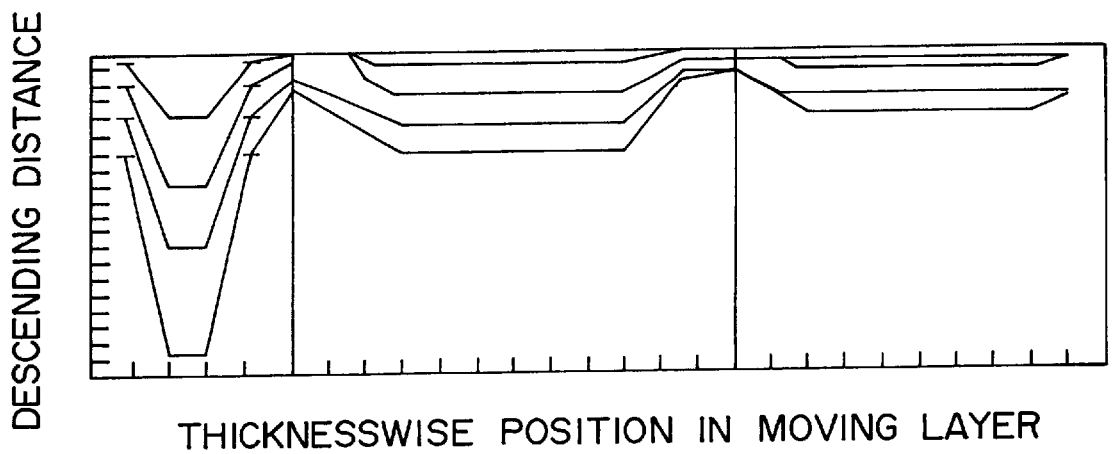
FIG. 4 is a distribution diagram of moving speeds of activated carbon in the first embodiment.

FIG. 4 is a distribution diagram of moving speeds of activated carbon in the first embodiment. In FIG. 4, a position in the moving layer 60 (FIG. 3) in the direction of the layer thickness is read along the abscissa, while the activated carbon's descending distance per unit time is read along the ordinate.

In this case, the moving speeds v1, v2 and v3 of activated carbon in the front chamber 64, the intermediate chamber 65 and the rear chamber 66, respectively, are taken as follows:

$v1 : v2 : v3 = 4 : 2 : 1$

As dust concentration at the gas inlet 34 increases, the layer thicknesses d1 and d2 of the front chamber 64 and the intermediate chamber 65, respectively, are set such that d1 and d2 account for a greater portion of the overall thickness of the moving layer 60, and the moving speeds v1 and v2 are increased.

When a higher dust collection efficiency is required, the layer thickness d2 of the intermediate chamber 65 is increased, and the moving speed v2 is also increased.

Further, when dust concentration at the treated gas outlet 35 is to be lowered, the layer thickness d3 of the rear chamber 66 is increased, and the moving speed v3 is also increased.

Next, a pressure loss distribution will be described.

Figure 5:
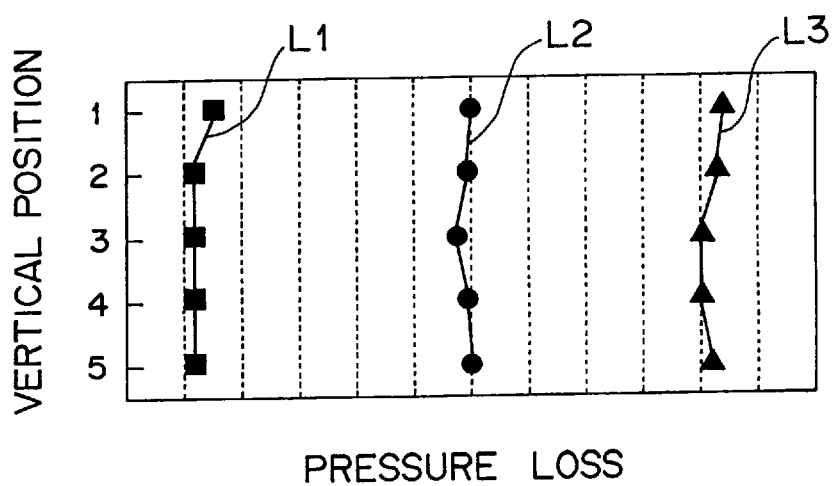
FIG. 5 is a distribution diagram of pressure losses of a gas flow in the moving layer of the first embodiment under normal conditions.
Figure 6:
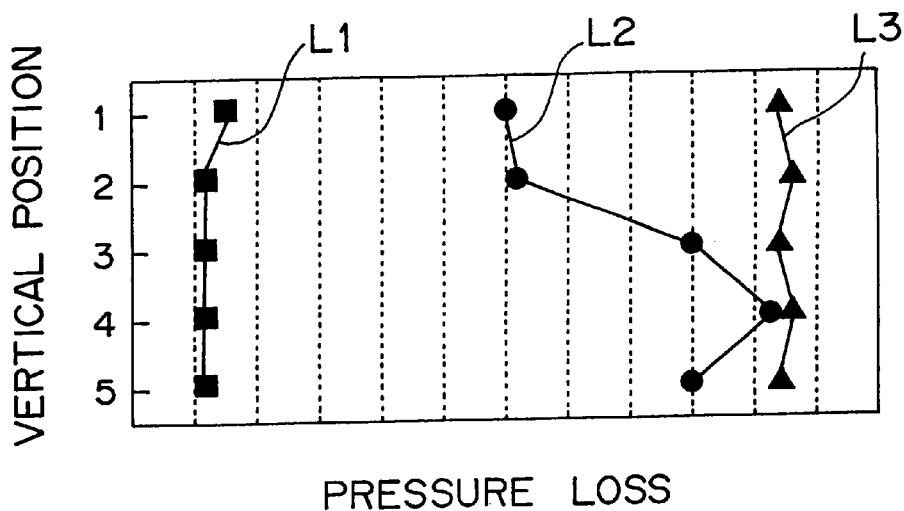
FIG. 6 is a distribution diagram of pressure losses of a gas flow in the moving layer of the first embodiment under unusual conditions.

FIG. 5 is a distribution diagram of pressure losses in the moving layer of the first embodiment under normal conditions. FIG. 6 is a distribution diagram of pressure losses in the moving layer of the first embodiment under unusual conditions. In FIGS. 5 and 6, a pressure loss is read along the abscissa, while a vertical position in the moving layer is read along the ordinate.

In FIGS. 5 and 6, symbol L1 denotes a pressure loss in the front chamber 64 (FIG. 3), L2 denotes a pressure loss in the intermediate chamber 65, and L3 denotes a pressure loss in the rear chamber 66.

When the moving layer 60 is functioning normally, the pressure loss in each of the front, intermediate and rear chambers 64, 65 and 66 is as shown in FIG. 5.

Specifically, the pressure loss slightly increases at the upper portions of the front and rear chambers 64 and 66 and at the lower portion of the intermediate chamber 65. When the pressure loss distribution hardly varies along a vertical direction as shown in FIG. 5, it indicates that activated carbon is moving at appropriate speeds v1, v2 and v3, and the activated carbon does not become clogged with dust or stagnant. In this case, the apparent density and the dense porosity of activated carbon remain unchanged along a vertical direction.

Since the layer thickness d2 of the intermediate chamber 65 is appropriately set, and the layer thickness d3 of the rear chamber 66 are set relatively large, a pressure loss in the rear chamber 66 becomes greater than that in the intermediate chamber 65. Thus, when a proportional relation is established between a pressure loss and the layer thicknesses d1, d2 and d3, it indicates that activated carbon is moving at appropriate speeds v1, v2 and v3, and the activated carbon does not become clogged with dust or stagnant.

By contrast, when the moving layer 60 fails to properly function, a pressure loss in each of the front, intermediate and rear chambers 64, 65 and 66 becomes as shown in FIG. 6, for example.

Accordingly, when a pressure loss becomes excessively large at the lower portion of the intermediate chamber 65, the gas flow deviates toward the upper portion of the tower 31. As a result, dust re-scatters in the upper portion of the rear chamber 66, and activated carbon becomes clogged with dust or stagnant in the lower portion of the intermediate chamber 65.

Next will be described the layer thicknesses d1, d2 and d3 of the front chamber 64, the intermediate chamber 65 and the rear chamber 66, respectively.

Figure 7:
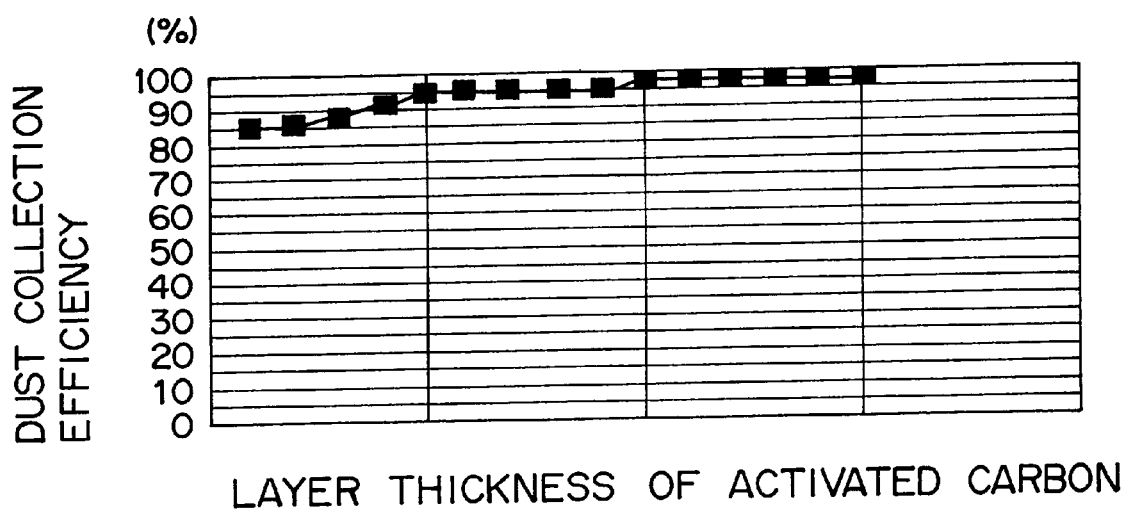
FIG. 7 is a diagram showing a dust collecting characteristic of activated carbon.

FIG. 7 is a diagram showing a dust-collecting characteristic of activated carbon. In FIG. 7, the layer thickness of activated carbon is read along the abscissa, and the dust collection efficiency of activated carbon is read along the ordinate.

When columnar activated carbon having a mean diameter of 7 to 9 mm is used for filtration and collection of fine dust having a mean grain size of 30 $\mu$m, the thickness of the activated carbon layer does not need to be increased as it would be to increase the desulfurizing and denitrating efficiencies. While dependent on the temperature of the inlet gas, layer thicknesses $d_D$, $d_S$ and $d_N$ required for increasing dust collection efficiency, desulfurizing efficiency and denitrating efficiency, respectively, hold to the following relation:

$$dN > dS > dD$$

It is seen from FIG. 7 that a dust collection efficiency of 85% to 90% can be attained through use of a layer thickness of 30% the overall thickness of the activated carbon layer.

Thus, the layer thickness d2 of the intermediate chamber 65 can be varied in accordance with dust concentration, dust collection difficulty and so on.

Next will be described the moving speed v2 of activated carbon in the intermediate chamber 65.

Figure 8:
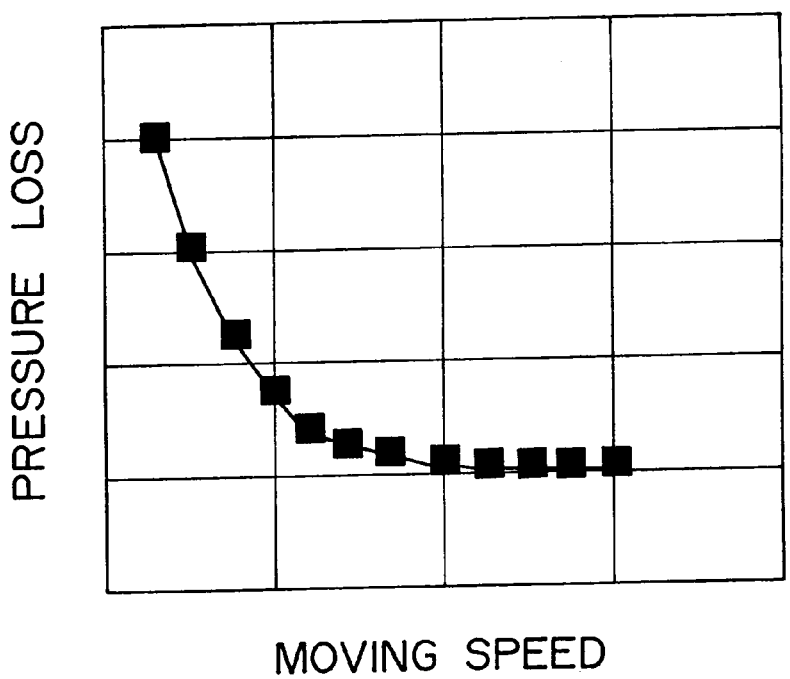
FIG. 8 is a diagram showing the relation between the moving speed of activated carbon and a pressure loss in an intermediate chamber in the first embodiment.

FIG. 8 is a diagram showing the relation between the moving speed of activated carbon and a pressure loss in the intermediate chamber in the first embodiment. In FIG. 8 the moving speed of activated carbon in the intermediate chamber 65 (FIG. 3) is read along the abscissa, while a pressure loss in the intermediate chamber 65 is read along the ordinate.

As mentioned previously, a layer thickness required for collecting dust does not account for a large portion of the overall thickness of the moving layer 60, i.e. most dust can be collected through use of a relatively thin portion of the moving layer 60. Accordingly, in such a portion of the moving layer 60, dust load per grain of activated carbon is relatively large.

In the intermediate chamber 65, the moving speed v2 of activated carbon and the pressure loss hold to the relationship as represented in FIG. 8.

In the present embodiment, an inflection point exists about 0.1 to 0.15 m/h of the moving speed v2. Accordingly, in the intermediate chamber 65, a limit to the moving speed v2 is preferably 0.15 to 0.2 m/h for safety.

Next will be described dust concentration at the treated gas outlet 35.

Figure 9:
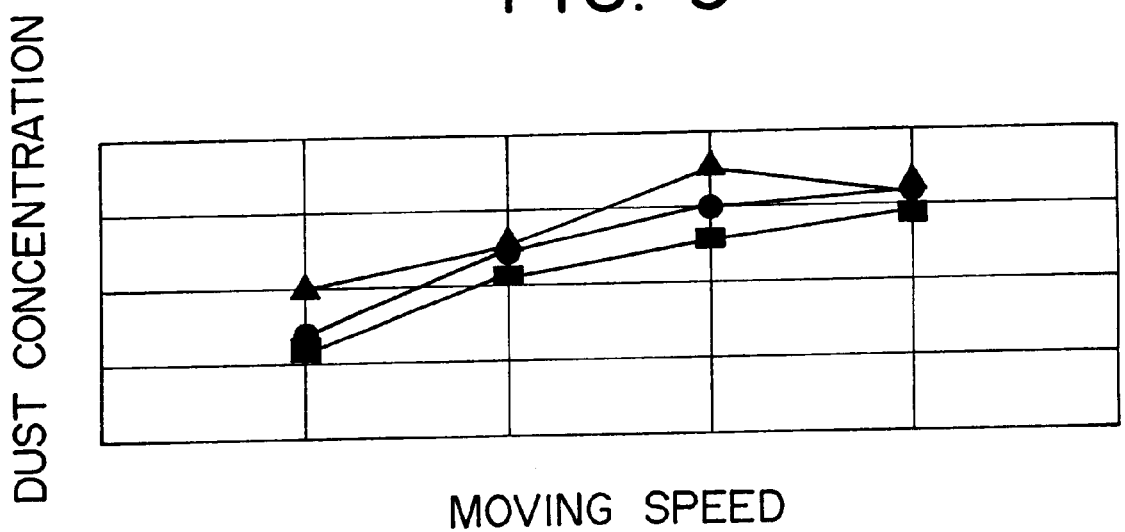
FIG. 9 is a diagram showing the relation between the moving speed of activated carbon in a rear chamber and dust concentration in the first embodiment.

FIG. 9 is a diagram showing the relationship between the moving speed of activated carbon in the rear chamber and dust concentration in the first embodiment. In FIG. 9, the moving speed of activated carbon in the rear chamber 66 (FIG. 3) is read along the abscissa, while dust concentration at the treated gas outlet 35 is read along the ordinate.

In order to reduce dust concentration at the treated gas outlet 35 to, for example, 10 to 20 mg/Nm$^3$, the moving speed v3 of activated carbon in the rear chamber 66 must be decreased as much as possible to thereby restrain activated carbon from forming a powder which will scatter.

Dust concentration at the treated gas outlet 35 depends on the mean grain size of the dust and the flow rate of the gas, but can be reduced when the moving speed v3 of activated carbon in the rear chamber 66 is set to not greater than 0.15 m/h, preferably not greater than 0.1 m/h.

Next, a second embodiment of the present invention will be described.

Figure 10:
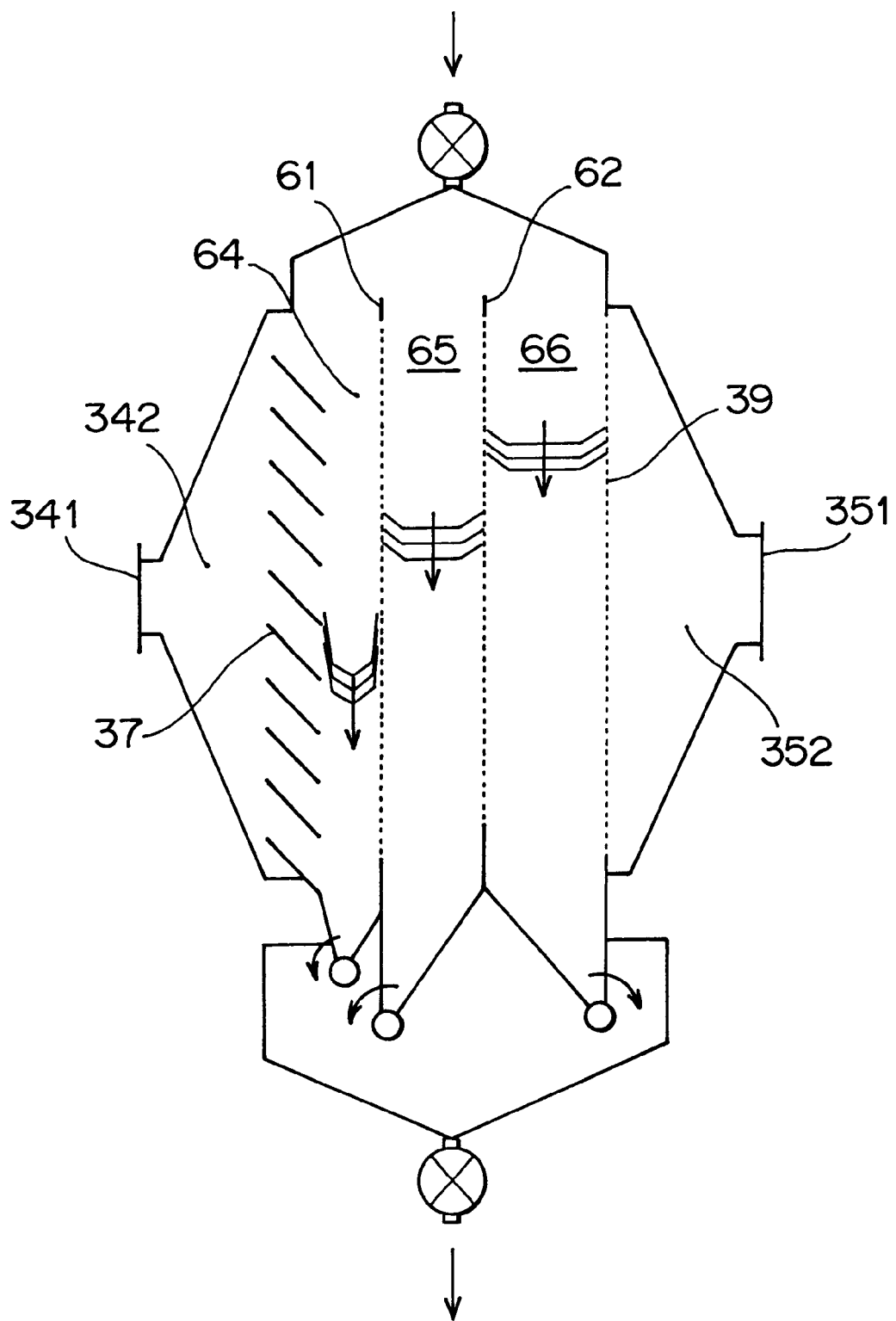
FIG. 10 is a sectional view of a waste gas treatment apparatus according to a second embodiment of the present invention.

FIG. 10 is a sectional view of a waste gas treatment apparatus according to the second embodiment of the present invention. The same features as those of the first embodiment are denoted by common reference numerals, and their description is omitted.

In the second embodiment, a conical flue 342 is formed between a gas inlet 341 and an inlet louver 37, and a conical flue 352 is formed between a treated gas outlet 351 and an outlet perforated plate 39. Accordingly, a gas fed into the conical flue 342 through the gas inlet 341 has a flow rate as low as 1/10 to 1/20 that in a flue (not illustrated) connected to the treated gas outlet 351, so that dust precipitates in the conical flue 342. As a result, the gas fed from the conical flue 342 to a front chamber 64 further disperses.

The present invention is not limited to the above-described embodiments. Numerous modifications and variations of the present invention are possible in light of the spirit of the present invention, and they are not excluded from the scope of the present invention.

What is claimed is:

1. A waste gas treatment apparatus comprising:
    a vessel having an interior, an upper inlet, a lower outlet; a gas inlet and a gas outlet;
    means for circulating grains for treating a waste gas, in a continuous loop including a moving layer of the grains within said vessel between said upper inlet and said lower outlet;
    a first perforated plate vertically dividing said interior of said vessel to define a front chamber in combination with the gas inlet, said first perforated plate preventing the travel of the grains therethrough;
    a second perforated plate vertically dividing the interior of said vessel and disposed between said first perforated plate and the gas outlet to define an intermediate chamber in cooperation with said first perforated plate and a rear chamber in cooperation with the gas outlet, said second perforated plate preventing the travel of the grains therethrough, said front, intermediate and rear chambers each containing a portion of the moving layer;
    grain flow controllers disposed at the bottom of each of and controlling the flows of the grain through, respectively, the front chamber, the intermediate chamber and the rear chamber, whereby rate of flow of the grains through each of said chambers can be individually controlled, said grain flow controllers being adjusted to make the rate of flow of the grains through the front chamber higher than the rate of flow of grains through said intermediate chamber, to thereby provide smooth flow of the waste gas through said vessel and to make the flow of the grains through the rear chamber lower than the rate of flow of the grains through the intermediate chamber to thereby reduce wear of the grains, powder formation and scattering.

2. A waste gas treatment apparatus according to claim 1, wherein the grain moves downward at a speed v2 in said intermediate chamber, said v2 being set to (2/3)·v1 to (1/5)·v1, where v1 is the speed of grain movement in said front chamber, and wherein the grain moves downward at a speed v3 in said rear chamber, said v3 being set to (2/3)·v2 to (1/5)·v2.

3. A waste gas treatment apparatus according to claim 1, wherein the grain moving layer in said front chamber has a layer thickness 10% to 20% the overall thickness of the moving layer, and the grain moving layer in said intermediate chamber has a layer thickness 20% to 45% the overall thickness of the moving layer.

4. A waste gas treatment apparatus according to claim 1, further comprising:
    a single louver arranged parallel to said perforated plates and located between said first perforated plate and said gas inlet, said single louver being the only louver within said vessel.

5. A waste gas treatment apparatus according to claim 1, further comprising:
    a third perforated plate located between said second perorated plate and said gas outlet and separating the portion of the moving layer in said rear chamber from said gas outlet.

6. A waste gas treatment apparatus according to claim 4, further comprising:
    a third perforated plate located between said second perforated plate and said gas outlet and separating the portion of the moving layer in said rear chamber from said gas outlet.

* * * * *